United States Patent [19]

Goldfarb

[11] 3,724,803
[45] Apr. 3, 1973

[54] GEAR MOLDING DEVICE

[76] Inventor: Adolph E. Goldfarb, 4614 Monarca Drive, Tarzana, Calif. 91356

[22] Filed: Sept. 29, 1970

[21] Appl. No.: 76,452

[52] U.S. Cl. ...............249/102, 249/102, 249/160, 425/183
[51] Int. Cl. ............................................F16k 51/00
[58] Field of Search ......18/42 D, 4 R, DIG. 47, 16.5, 18/16 R, 16.7; 249/160, 156, 102; 425/195, 192, 256, 450, 182, 183, 242

[56] References Cited

UNITED STATES PATENTS

| | | | |
|---|---|---|---|
| 2,509,783 | 5/1950 | Richardson | 18/16.7 |
| 3,020,589 | 2/1962 | Maritano | 18/16.5 |
| 2,549,939 | 4/1951 | Shan et al. | 18/16.7 X |
| 2,893,058 | 7/1959 | Wurtz et al. | 18/DIG. 47 |
| 3,193,884 | 7/1965 | Haynie et al. | 18/DIG. 47 |
| 3,550,216 | 12/1970 | Barr | 425/192 |

Primary Examiner—J. Spencer Overholser
Assistant Examiner—Michael O. Sutton
Attorney—Sokolski & Wohlgemuth and Robert M. Ashen

[57] ABSTRACT

A device useful for molding gears of plastic or other material and particularly for molding multiple gears, which device comprises first and second opposed end plates, the first end plate preferably having a removable insert therein for selectively controlling the hub dimensions for molded gears, and the second end plate preferably having at least an opening therein for admitting the molding material. Disposed between the end plates is at least one additional plate containing the configuration of a gear to be molded. By stacking additional plates having configurations of additional gears one on top of another between the two end plates, a plurality of multiple integrally-formed gears of selected dimensions and pitch, and with selected hub and shaft holes can be readily formed.

7 Claims, 11 Drawing Figures

PATENTED APR 3 1973 3,724,803
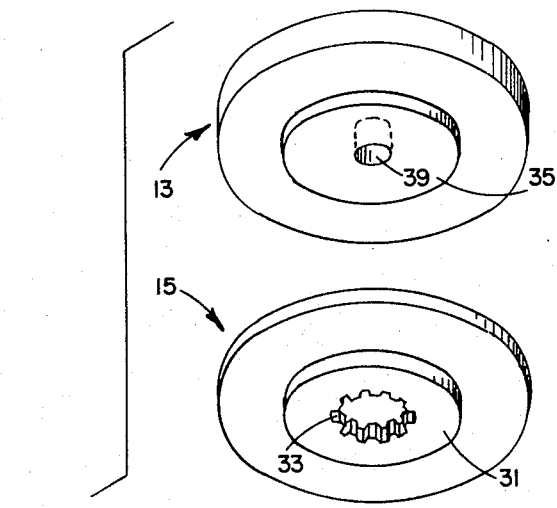
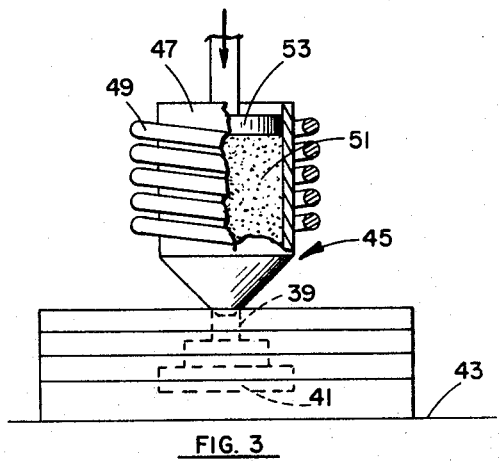
FIG. 1
FIG. 3
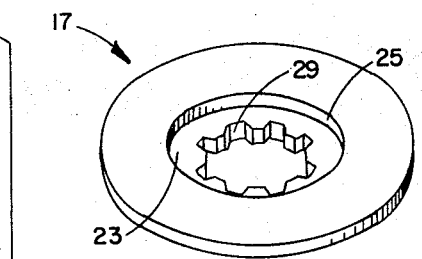
FIG. 6
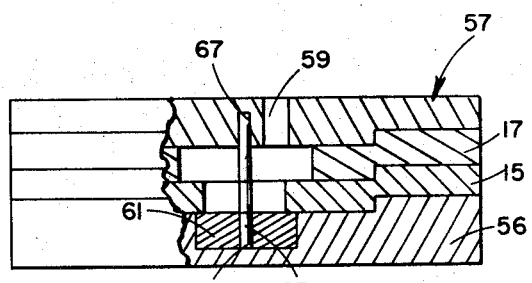
FIG. 7
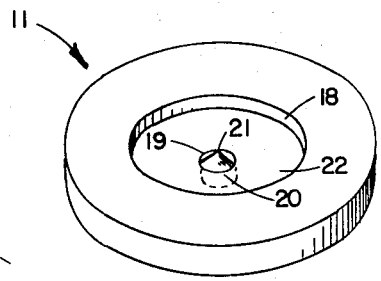
FIG. 5
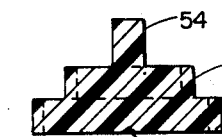
FIG. 4
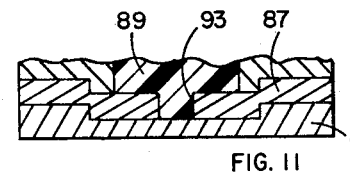
FIG. 11
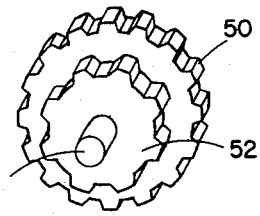
FIG. 9    FIG. 10
INVENTOR
ADOLPH E. GOLDFARB
BY
ROBERT M. ASHEN
ATTORNEY
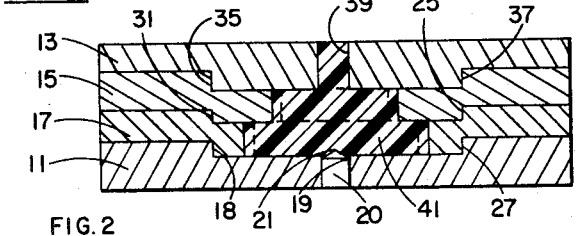
FIG. 2
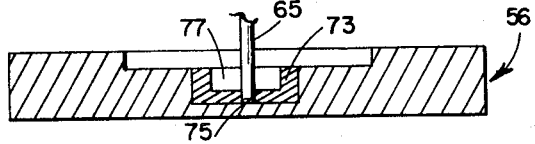
FIG. 8

GEAR MOLDING DEVICE

Prior to the herein invention, multiple gears and additionally dies for forming multiple gears out of plastic or other material both had to be custom made to the requirements of a particular application as needed. The reason for such a requirement was that heretofore a gear manufacturing company could not inventory the thousands of possible combinations and permutations of multiple gear arrangements. Thus, for example, if one were desirous of forming a prototype or model and needed a multiple gear arrangement therein, it was not possible to readily obtain such since neither the gear was available nor was a mold whereby such a gear could easily be formed. Further there were not alternate means of providing such gears quickly and at reasonable cost. In addition to the problem of readily forming and obtaining multiple gear arrangements, a further problem is in the possible combinations of hubs and/or shaft holes with a single or multiple gear. Often a hub is required to be disposed on the side of a gear. Depending upon the application, the length and diameter of the hub can vary considerably. The same is true of the diameter of the shaft hole or aperture through the gear. Once again, it has not been possible to readily obtain a combination of a hub or hole with either a single gear or multiple gear arrangement without necessitating the expense and delay in time of custom making the arrangement. One of the most apparent drawbacks in the aforegoing areas of multiple gears and the association of a gear or gears with the hub or hole is that the user normally must rely on an outside source and cannot readily provide himself in plant the particular arrangement desired for experiments, prototype models and the like.

Thus it is an object of this invention to provide a means for readily forming a wide selection of multiple gear arrangements and a wide variation of combinations of hub and/or hole sizes with a single gear or multiple gear arrangement.

Briefly, the herein invention relates to a mold device having changeable parts so as to provide for selectively molding multiple gears of differing dimensions and pitch, as well as having different hub or hole sizes. The mold device is comprised of two separate end plates. A first end plate may preferably have a recess formed therein which will serve to selectively receive desired inserts. The inserts have apertures therein to control the hub dimensions on a gear or multiple gear arrangement. The second and opposite end plate will preferably have an aperture therethrough so that the molding material, such as plastic or the like, can be injected between the two plates. Between the plates, there is disposed at least one additional plate having a gear formed therein of the desired dimensions. By stacking two intermediate plates having differing gear sizes therein between the two end plates, the device will form a multiple contiguous gear arrangement. In practicing the invention, the user of the mold device is provided with a series of gear plates having differing diameter gears of selected pitches. In one embodiment of the invention, a pin or rod can be inserted through the plates containing the gear forms and seated within the two end plates so that a center aperture or shaft hole will be formed through the gears which can correspond to the diameter of an axle or shaft on which the gears can be mounted. As a feature of the herein invention, means may be provided for interlocking the plates relative to each other to assure proper alignment prior to injecting the molding material therein.

It is believed the invention will be better understood from the following detailed description and drawings in which:

FIG. 1 is an exploded view of an assembly of plates utilized in the mold device of the invention.

FIG. 2 is a cross-sectional view of the assembled plates of FIG. 1.

FIG. 3 is a pictorial representation of the assembled mold plates of FIG. 2 and a means for injecting plastic therein.

FIG. 4 is a cross-sectional view of a multiple gear formed from the device shown in FIGS. 1-3.

FIG. 5 is a pictorial representation of the gear of FIG. 4.

FIG. 6 is a cross-sectional view of an assembled mold device of a further embodiment of this invention.

FIG. 7 is a cross-sectional view of a multiple gear utilizing the arrangement seen in FIG. 6.

FIG. 8 is a cross-sectional view of a bottom plate of another embodiment of a mold device of this invention.

FIG. 9 is a partially sectioned view of an insert for a bottom first end plate of a mold device.

FIG. 10 is a different embodiment of an insert for a bottom first end plate of a mold device of the invention.

FIG. 11 is a partial cross-sectional view of an embodiment of the invention for forming a hub of a gear.

Turning now to FIG. 1, there is seen an exploded view of an assembly of a typical mold device of the invention. This device comprises a first bottom end plate 11, a second opposite upper end plate 13, and intermediate gear mold plates 15 and 17. The plates 11-17 are all seen as having circular exterior configuration. This, of course, is not required and the plates can be rectangular or any desired shape in their outer periphery since it has no bearing on the resulting end device. The first end plate 11 is seen as having a circular recess 18 formed concentrically therein. Additionally, at about the center of the plate there is an aperture 19 which is shown as having a plug 20 disposed therein having a upper pointed end 21 which extends slightly above the surface 22 of the recess portion 18. Plate 17, which is disposed next to the end plate 11, has a concentric offset portion 23 formed therein so as to provide a corresponding circular recess 25 on one side of the plate and a corresponding projection 27 on the opposite side. The projection 27 has a diameter essentially equivalent to the diameter of the recess portion 18 of the end plate 11 so that it will fit within the recess as particularly seen in FIG. 2. This provides for a positioning and lateral locking of plate 17 relative to plate 11 and assures that the proper alignment is maintained through the molding operation. Within the offset portion 23 there is formed therethrough a gear outline 29.

Plate 15 is of the same construction as plate 17, having an offset portion which provides a projection 31 in which is formed an outline of a smaller gear 33. The projection 31 of plate 15 is seated within the recess 25 of plate 17, once again providing a locking of the two plates relative to each other as can be seen in FIG. 2. The upper second end plate 13 has a concentric projection 35 extending therefrom toward the first end plate 11. The projection 35 is seated in a recess 37 of plate 15 as can be seen in FIG. 2. A cylindrical inlet aperture 39 is provided through center enter of the end plate 13.

It can now be appreciated as seen from FIG. 2 that as many gears as desired of differing dimensions and pitches can be stacked between the end plates 11 and 13, providing for enumerable variations as to sizes and pitches of gears. The locking arrangement utilized is but one means to achieve proper alignment. Obviously all the plates can have completely flat surfaces on both sides thereof and can be held within a jig or other arrangement to assure alignment. The means shown in FIGS. 1 and 2 is the preferred way of achieving the effect. The interlocking projections from the gear molding plates, of course, do not have to be circular but could be rectangular or of any interlocking geometric shape or configuration which will permit the same end results.

When assembled, as seen in FIG. 2, a center cavity 41 exists which is to be filled with the molding material. The assembled mold plates can as seen in FIG. 3, be placed on a suitable surface 43 and an injection means 45 can be disposed at the inlet 39. Typical injection means would comprise a cylinder 47 heated by coils 49 and containing a suitable plastic mixture 51. A piston 53 can be forced downwardly to drive the heated melted plastic material into the cavity 41 to produce the desired gear. The gear, as seen in FIGS. 4 and 5, has a large gear, 50 a smaller contiguous gear 52, and a hub 54 extending from the smaller gear. Alternatively, the portion 54 which corresponds to the inlet 39 in the top plate 13, can be subsequently cut off if desired. The point 21 of the bottom insert 20 in plate 11, provides a slight pointed indentation 55 in the larger gear 50. This indentation serves as a guide for drilling a hole therethrough and the like.

Turning now to FIG. 6, there is seen an arrangement whereby a center aperture or shaft hole can be provided through a multiple gear. In this arrangement the same intermediate gear forming plates 17 and 15 are utilized as seen in FIG. 1. In this arrangement the plate 15 for forming the smaller gear is adjacent a bottom end plate 56 while the plate 17 for forming the larger gear is adjacent an upper end plate 57. The upper end plate 57 has an opening therethrough 59 for admitting the molding material. The opening 59 in this instance, however, is off the center line through the gear to be molded. The reason for this will become apparent from the following description. An insert 61 in the bottom end plate 56, has an aperture 63 in the center thereof in which is seated a rod 65 extending upwardly through the center of the gear forming plates 15 and 17 into a corresponding aperture 67 in the upper end plate 57. Thus the rod 65 which has an outer diameter corresponding to the aperture desired through the molded gear is seated in the two end plates 56 and 57 respectively. Because the rod 65 is located on the center line, it is necessary that the opening 59 for admitting the molding material be off to one side. By having the rod 65 present when molding, the resulting gear 69 as seen in FIG. 7 will have a center aperture 71 therethrough. FIG. 8 discloses the bottom end plate 56 having an insert 73 therein which has both an aperture 75 for receiving the rod 65 plus a circumferential recessed portion 77 surrounding the rod. The resulting molded gear will then be provided with both a center aperture therethrough and a hub corresponding to the diameter and depth of recess 77.

FIGS. 9 and 10 are illustrative of two different inserts 79 and 81 respectively. In insert 79 there is a center recess 83. When the insert 79 is placed in a bottom end plate 56, a hub will be formed on the adjacent gear in accordance with the diameter and depth of the recess 83. In the insert 81 of FIG. 10 there is a center aperture 85 extending therethrough which has a diameter greater than the diameter of the recess 83 of insert of 79. Thus, a hub will be formed on an adjacent gear when the insert 81 is disposed in end plate 56 which will have a length and diameter greater than the hub formed in the embodiment of FIG. 9. Thus FIGS. 9 and 10 indicate that variations can be achieved in hub lengths and diameters depending upon the recesses provided in the insert members to be disposed in end plate 56.

The use of inserts permits variations such as noted above as well as variations in diameter of the hub and/or shaft hole, all with a single end plate 56.

The present invention is particularly useful in model making where design may be changed frequently. Further, the designer can experiment empirically with different gears, using different materials, gear sizes and ratios, etc. because of the ability to quickly and easily change these variables and produce usable gears. The ability to shift to different materials quickly is also important; for example it may be necessary to change to a higher strength material or to a material producing less gear noise.

Though the previous discussion has related to using an insert to provide a hub, it should be apparent that such can be achieved by an additional intermediate plate. As seen in FIG. 11, a hub plate 87 can be disposed between gear forming plate 89, and end plate 91. Hub plate 87 has an opening 93 therein corresponding to the desire hub to be formed.

Though the above discussion has been with regard to providing an inlet for the molding material through one end plate particularly, such is not mandatory. For example, it should be apparent that the inlet could be in the same plate containing the insert. The insert 81 shown in FIG. 10 could well be utilized for the aforegoing purpose, wherein opening 85 could serve both as a means for admitting the molding material and forming a resulting hub. In such an instance, the opposite end plate could be completely solid.

I claim:

1. A gear molding device comprising:
 a first end plate having a removable insert therein,
 a second end plate, means defining an aperture through one of said end plates for admitting molding material,
 and at least one intermediate plate disposed between said first and second plates with an aperture having a configuration of a desired gear shape, said insert having a recess therein for forming a hub on a hear formed in the aperture of said intermediate plate.

2. The device of claim 1 further comprising:
 means for interlocking the plates relative to each other, sufficient to prevent lateral movement.

3. The device of claim 2 wherein said means for interlocking said plates additionally co-aligns all plates along a center line.

4. The device of claim 1 wherein said first plate has a recess formed therein about the center of said plate for receiving said removable insert.

5. The device of claim 1 wherein there are at least two intermediate plates, each plate aperture having a differing gear configuration formed therein.

6. A gear molding device comprising:
a first end plate,
a second end plate having an aperture therethrough for admitting molding material,
at least one intermediate plate disposed between said first and second plates with an aperture having a configuration of a desired gear shape,
and an additional plate disposed adjacent said intermediate plate, said additional plate having an opening therein corresponding to a hub desired to be integrally molded on the gear.

7. A gear molding device comprising:
a first end plate having a removable insert therein,
a second end plate, means defining an aperture through one of said end plates for admitting molding material,
and at least one intermediate plate disposed between said first and second plates with an aperture having a configuration of a desired gear shape, said insert having a conically pointed end extending in toward the center of the aperture in the intermediate plate adjacent said second plate.

* * * * *